US008565064B2

(12) United States Patent
Tang et al.

(10) Patent No.: US 8,565,064 B2
(45) Date of Patent: *Oct. 22, 2013

(54) SYSTEM AND METHOD FOR EMPLOYING SIX-BIT RANK 1 AND 2 CODEBOOKS FOR FOUR TRANSMIT ANTENNAS

(75) Inventors: Yang Tang, San Diego, CA (US); Yajun Kou, San Diego, CA (US); Young Hoon Kwon, San Diego, CA (US); Zhigang Rong, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 436 days.

This patent is subject to a terminal disclaimer.

(21) Appl. No.: 12/636,288

(22) Filed: Dec. 11, 2009

(65) Prior Publication Data

US 2010/0177742 A1 Jul. 15, 2010

Related U.S. Application Data

(60) Provisional application No. 61/122,638, filed on Dec. 15, 2008.

(51) Int. Cl.
*H04J 11/00* (2006.01)

(52) U.S. Cl.
USPC ............................ 370/208; 370/328; 375/260

(58) Field of Classification Search
USPC ......... 370/208–209, 328–338, 343–344, 476; 375/260–267, 299; 455/522
See application file for complete search history.

(56) References Cited

U.S. PATENT DOCUMENTS

| 2008/0037669 A1* | 2/2008 | Pan et al. ................ 375/260 |
| 2008/0192704 A1 | 8/2008 | Kent et al. |
| 2008/0192852 A1 | 8/2008 | Kent et al. |

(Continued)

FOREIGN PATENT DOCUMENTS

| CN | 101247157 A | 8/2008 |
| CN | 101257367 A | 9/2008 |

(Continued)

OTHER PUBLICATIONS

International Search Report and the Written Opinion of the International Searching Authority, International Application No. PCT/CN2009/075586, Applicant: Huawei Technologies Co., LTD., Mar. 25, 2010, 14 pages.

(Continued)

*Primary Examiner* — Ricky Ngo
*Assistant Examiner* — Iqbal Zaidi
(74) *Attorney, Agent, or Firm* — Slater & Matsil, L.L.P.

(57) ABSTRACT

A system and method for employing six-bit rank 1 and 2 codebooks for four transmit antennas is provided. A method for communications device operation includes estimating a communications channel between the communications device and a controller serving the communications device, thereby producing a channel estimate, quantizing the channel estimate using a codebook, thereby producing a selected codeword, and transmitting an index corresponding to the selected codeword from the codebook to the controller. The codebook includes a plurality of first level codewords, with each first level codeword having a plurality of subsidiary codewords. The quantizing is a search of only the first level codewords followed by a search of a subset of the plurality of subsidiary codewords, and the codebook is based on a rank of communications between the communications device and the controller.

29 Claims, 4 Drawing Sheets

(56) References Cited

U.S. PATENT DOCUMENTS

| | | | |
|---|---|---|---|
| 2008/0292013 A1 | 11/2008 | Varadarajan et al. | |
| 2010/0027697 A1* | 2/2010 | Malladi et al. | 375/260 |
| 2010/0027713 A1 | 2/2010 | Huang et al. | |
| 2010/0142599 A1 | 6/2010 | Tang et al. | |
| 2011/0128917 A1* | 6/2011 | Ko et al. | 370/328 |

FOREIGN PATENT DOCUMENTS

| | | |
|---|---|---|
| CN | 101286824 A1 | 10/2008 |
| CN | 101340219 A | 1/2009 |
| CN | 101534268 A | 9/2009 |
| WO | WO 2008/086239 A1 | 7/2008 |

OTHER PUBLICATIONS

Boccardi, F., et al., "Hierarchical Quantization and its Application to Multiuser Eigenmode Transmissions for Mimo Broadcast Channels with Limited Feedback," 18th Annual IEEE International Symposium on Personal Indoor and Mobile Radio Communications, Sep. 1, 2007, 5 pages.

Huang, Y., et al., "Limited Feedback Precoding Based on Hierarchical Codebook and Linear Receiver," IEEE International Conference on Communications, May 19, 2008, pp. 4749-4753.

Tang, Y. et al., "6-bit Codebooks for 4 Transmit Antennas," IEEE Draft 802.16m-8/1510, Broadband Wireless Group, Oct. 25, 2008, pp. 1-10.

Tang, Y., et al., "DL SU-MIMO Codebooks," IEEE Draft C802.16m-08_1109, Broadband Wireless Access Working Group, Sep. 5, 2008, pp. 1-9.

Tang, Y., et al., "Proposal for 6bit Codebooks for 4 Transmit Antennas," IEEE Draft C802.16M-09/0106r1, Broadband Wireless Access Working Group, Jan. 5, 2009, pp. 1-6.

"Precoding Codebook Design for 4 Node-B Antenna," Texas Instruments, 3GPP Draft; R1-071798 TI Codebook 4 Ants Update, $3^{rd}$ Generation Partnership Project, Mobile Competence Centre, 3GPP TXG RAN WG1 48bis, Mar. 26-30, 2007, pp. 1-11.

Extended European Search Report, International Application No. PCT/CN2009/075586, Date of mailing: Dec. 16, 2011, 13 pages.

First Chinese Office Action with Partial English Translation received in Chinese Application No. 2009/80149211.9 mailed Mar. 26, 2013, 14 pages.

\* cited by examiner

SYSTEM AND METHOD FOR EMPLOYING SIX-BIT RANK 1 AND 2 CODEBOOKS FOR FOUR TRANSMIT ANTENNAS

This application claims the benefit of U.S. Provisional Application No. 61/122,638, filed on Dec. 15, 2008, entitled "6-Bit Rank 1 and 2 Codebooks for Four Transmit Antennas," which application is hereby incorporated herein by reference.

TECHNICAL FIELD

The present invention relates generally to wireless communications, and more particularly to a system and method for employing six-bit rank 1 and 2 codebooks for four transmit antennas.

BACKGROUND

Communication system capacity generally may be significantly improved when the transmitter has full or partial channel state information (CSI). CSI may be obtained by the transmitter via a reverse feedback channel between the transmitter and the receiver. To accommodate the limited feedback channel bandwidth, CSI normally is quantized into a digital format at the receiver before feeding back to the transmitter. A codebook based algorithm generally is one of the most efficient ways to quantize the channel. A generic codebook may consist of multiple codewords. In general, the codeword is selected based on certain selection criteria and the corresponding codeword index is fed back from the receiver to the transmitter. The principles for codeword selection may be varied based on different precoding techniques.

A codebook comprises a set of precoding vectors (matrices). At least one of these vectors (matrices), also referred to as codeword, may be chosen by a mobile station (the receiver) and a related feedback message, which can be the codeword itself or its index, will be sent to the base station (the transmitter). The base station may use the vectors (matrices) to help improve the performance of transmissions to the mobile station.

Existing codebooks suffer significant challenges, however, including a balance between feedback overhead and quantization accuracy. Typically, the more codewords that a codebook has, the better the quantization accuracy. However, the large number of codewords also implies a large feedback overhead.

Another challenge in codebook design is a need to cover a wide range of channel characteristics. For example, correlated channels and uncorrelated channels have very different channel characteristics and, therefore, have different codebook design criteria.

SUMMARY OF THE INVENTION

These and other problems are generally solved or circumvented, and technical advantages are generally achieved, by embodiments of a system and method for employing six-bit rank 1 and 2 codebooks for four transmit antennas.

In accordance with an embodiment, a method for communications device operation is provided. The method includes estimating a communications channel between the communications device and a controller serving the communications device, thereby producing a channel estimate, quantizing the channel estimate using a codebook, thereby producing a selected codeword, and transmitting an index corresponding to the selected codeword from the codebook to the controller. The codebook includes a plurality of first level codewords, each first level codeword has a plurality of subsidiary codewords, and the codebook is based on a rank of communications between the communications device and the controller.

In accordance with another embodiment, a method for communications device operation is provided. The method includes estimating a communications channel between the communications device and a controller serving the communications device, thereby producing a channel estimate, performing a first stage quantization of the channel estimate using a codebook, thereby producing a selected first level codeword, and performing a second stage quantization of the channel estimate using the codebook, thereby producing a selected subsidiary codeword. The method also includes selecting either the selected first level codeword or the selected subsidiary codeword as a selected codeword and transmitting an index corresponding to the selected codeword to the controller. The codebook includes a plurality of first level codewords, and each first level codeword has a plurality of subsidiary codewords. The first stage quantization uses only the plurality of first level codewords, and the codebook is based on a rank of communications between the communications device and the controller. The second stage quantization uses a plurality of subsidiary codewords associated with the selected the first level codeword, and the selecting is based on which codeword provides a better solution to a codeword selection mechanism.

In accordance with another embodiment, a method for controller operation is provided. The method includes receiving a channel state information (CSI) from a communications device, reconstructing a channel estimate using the codebook and the index, adjusting transmission circuitry in the controller using the reconstructed first channel estimate, and transmitting a transmission to the communications device using the adjusted transmission circuitry. The CSI includes an index to a codeword in a codebook, and the codebook includes a plurality of first level codewords. Each first level codeword has a plurality of subsidiary codewords, and the codebook is based on a rank of communications between the communications device and the controller.

An advantage of an embodiment is that the rank 2 codebook has a nested property, allowing a reuse of calculations made using the rank 1 codebook, thereby reducing computations needed when using the rank 2 codebook.

A further advantage of an embodiment is that hierarchical searching of a codebook is supported to reduce codeword searching overhead.

An additional advantage of an embodiment is that the codebook is hierarchical in nature, which permits differential feedback, thereby reducing feedback overhead.

Yet another advantage of an embodiment is that good performance is provided for both correlated and uncorrelated communications channels.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a MIMO wireless communications system that makes use of channel state information to improve overall system efficiency. The MIMO wireless communications may be single-user (SU-MIMO) or multi-user (MU-MIMO) and may be compliant with any of a variety of technical standards, such as Long Term Evolution (LTE), LTE-Advanced, WiMAX, IEEE 802.16, and so forth.

Figure 1:
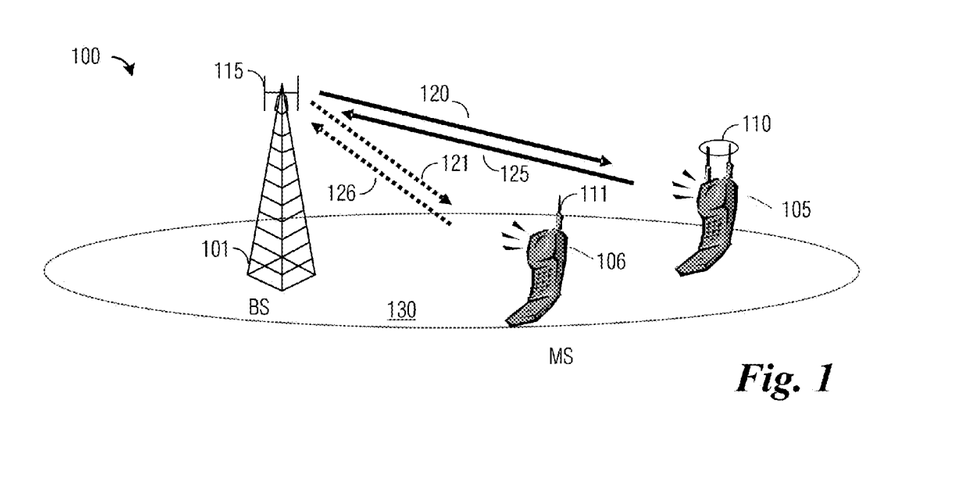
FIG. 1 is a diagram of a wireless communication system.

FIG. 1 illustrates a wireless communication system 100. Wireless communications system 100 includes a base station (BS) 101 and a plurality of mobile stations, such as MS 105 and MS 106, which may be mobile or fixed. BS 101 and MS 105 communicate using wireless communication. BS may also be referred to as base transceiver stations, Node Bs, enhanced Node Bs, and so forth, while mobile stations may also be referred to as subscriber units, terminals, mobile devices, user equipment, and the like.

BS 101 has a plurality of transmit antennas 115 while a MS may have one or more receive antennas, for example, MS 105 may have antennas 110 while MS 106 may have antenna 111. BS 101 sends control information and data to MS 105 through a downlink (DL) channel 120 while MS 105 sends control information and data to BS 101 through an uplink (UL) channel 125. Similarly, BS 101 sends control information and data to MS 106 through a DL channel 121 while MS 106 sends control information and data to BS 101 through an UL channel 126.

The MSs may send control information (including channel state information (CSI)) on UL channels 125 and 126 to improve the quality of the transmission on DL channels 120 and 121. BS 101 may send control information on DL channels 120 and 121 for the purpose of improving the quality of UL channels 125 and 126. A cell 130 is a conventional term for the coverage area of BS 101. It is generally understood that in wireless communication system 100 there may be multiple cells corresponding to multiple BSs.

In order to reduce control information overhead, the MSs may quantize the CSI. For example, instead of sending the CSI as analog values, the MSs may quantize the analog values to a specified number of bits, such as two, three, four, five, and so forth, and transmit the quantized CSI to BS 101.

To further reduce control information overhead, the MSs may use a codebook and transmit an index to a codeword in the codebook in place of the quantized CSI to BS 101. The index fedback to BS 101 represents a codeword in the codebook that is closest to the quantized CSI.

Since only the index is fedback to BS 101, the codebook must be known by both BS 101 and the MSs. The codebook may be pre-specified and stored in BS 101 and the MSs for subsequent use. Alternatively, the codebook may be provided to the MSs when the MSs attaches to BS 101. In yet another alternative, the codebook may be periodically provided to the MSs. In a further alternative, the codebook may be provided to both BS 101 and the MSs, either at initialization or periodically by a central controller.

Figure 2A:
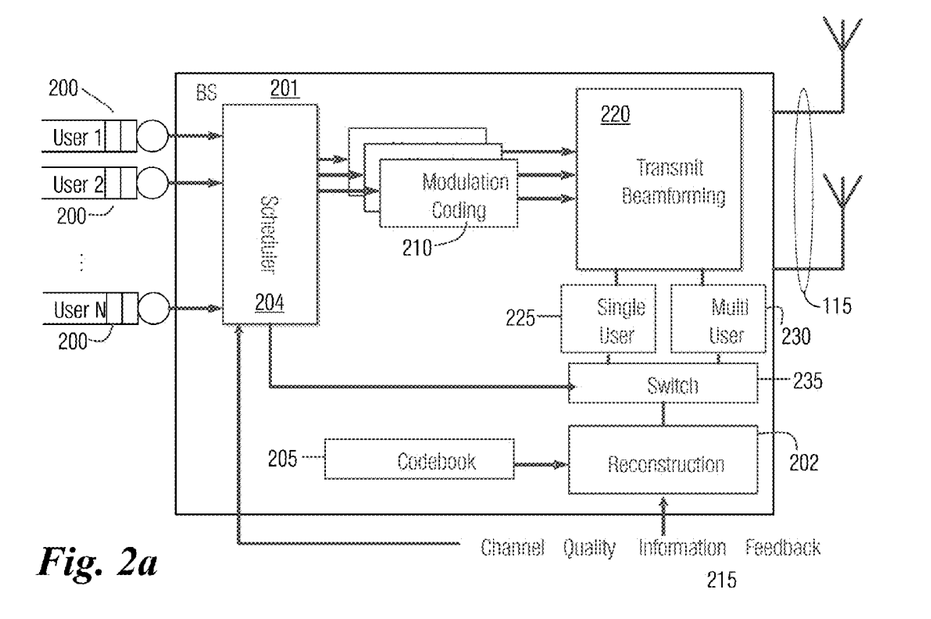
FIG. 2a is a diagram of a BS.

FIG. 2a illustrates a BS 201. Data 200, in the form of bits, symbols, or packets for example, destined for a plurality of MSs being served are sent to a scheduler 204, which decides which MSs will transmit in a given time/frequency opportunity. Data from the MSs selected for transmission are processed by modulation and coding block 210 to convert to transmitted symbols and add redundancy for the purpose of assisting with error correction or error detection. The modulation and coding scheme is chosen based in part on information about the channel quality information feedback 215.

The output of modulation and coding block 210 is passed to a transmit beamforming block 220, which maps the modulated and coded stream for each MS onto a beamforming vector. The beamformed outputs are coupled to antennas 115 through RF circuitry. The transmit beamforming vectors are input from single user (MS) block 225 or multi-user (MSs) block 230. Either beamforming for a single user (MS) or multi-user (MSs) beamforming may be employed, as determined by switch 235, based on information from scheduler 204 and channel quality information feedback 215. Part of each MS's channel quality information feedback includes a new feedback message that provides indices corresponding to quantized channel information as described in the embodiments.

Reconstruction block 202 uses the indices in channel quality information feedback 215 combined with a codebook 205 to reconstruct a high-resolution estimate of the quantized channel state information (CSI). The output of reconstruction block 202 is passed to switch 235 that forwards the information to either the single user (MS) block 225 or the multi-user (MSs) block 230. Other information may also be passed to these blocks, for example a SINR estimate may be passed to the multi-user (MSs) block 230 to improve its performance. Single user (MS) block 225 uses the output of reconstruction block 202 as the beamforming vector for the selected user (MS).

Multi-user (MSs) block 230 combines the codeword and other information from multiple users (MSs) to derive the transmit beamforming vectors employed for each MS. It may use any number of algorithms known in the literature including zero forcing, coordinated beamforming, minimum mean squared error beamforming, or lattice reduction aided precoding, for example.

Scheduler 204 may use any of the known scheduling disciplines in the literature including round robin, maximum sum rate, proportional fair, minimum remaining processing time, or maximum weighted sum rate; generally scheduling decisions are based on channel quality information feedback 215 received from the plurality of MSs. Scheduler 204 may decide to send information to a single MS via transmit beamforming or may decide to serve multiple MSs simultaneously through multi-user MIMO communication.

Modulation and coding block 210 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding, or block coding. The choice of modulation and coding rate in a preferred embodiment is made based on channel quality information feedback 215 in a preferred embodiment and may be determined jointly in scheduler 204.

While not explicitly illustrated, it is obvious to those of ordinary skill in the art that OFDM modulation can be used. Further, any number of multiple access techniques could be used including orthogonal frequency division multiple access; code division multiple access; frequency division multiple access; or time division multiple access. The multiple access technique may be combined with the modulation and coding block 210 or the transmit beamforming block 220 among others.

Channel quality information feedback 215 may, for purposes of illustration, be in the form of quantized channel measurements, modulation, coding, and/or spatial formatting decisions, received signal strength, and signal-to-interference-plus-noise measurements.

Figure 2B:
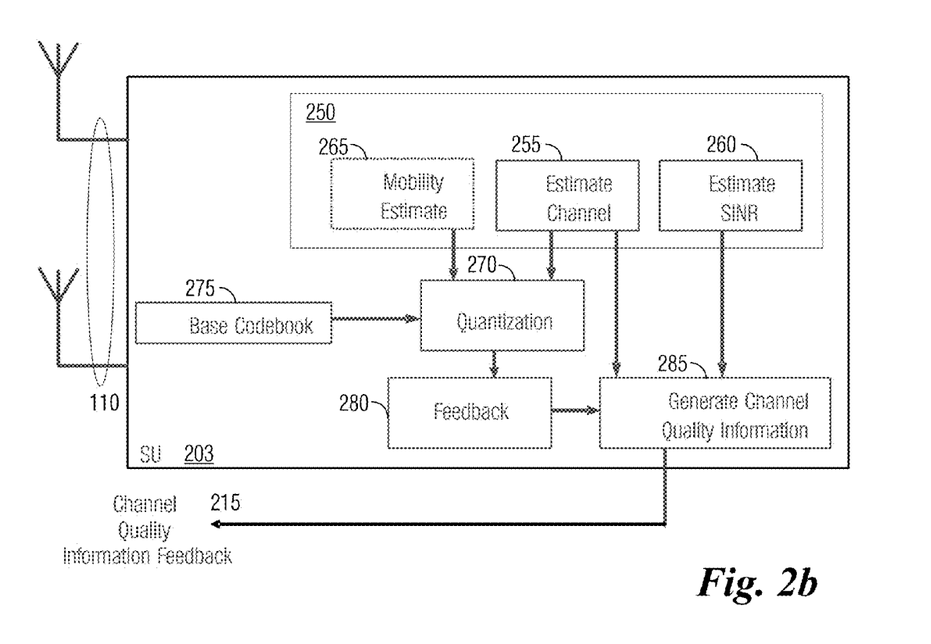
FIG. 2b is a diagram of a MS.

FIG. 2b illustrates a MS 203. MS 203 may have one or more receive antennas 110, connecting through RF circuitry to a receiver signal processing block 250. Some of the key functions performed by receiver signal processing block 250 include channel estimation block 255, estimate SINR block 260, and a mobility estimate block 265.

Channel state information is quantized using a quantization block 270 as described in the embodiments. Quantization block 270 quantizes the received signal to a codebook 275. An index from codebook 275 may be output from quantization block 270. An estimate of the amount of channel variation, produced by mobility estimate block 265, may be used to improve the quantization algorithm by initializing the algorithm from a previous quantization level or adjusting the amount of localization.

Feedback block 280 generates a new feedback message by combining the codebook indices output from quantization block 270. Generate channel quality information block 285 generates a special feedback control message employing the outputs of feedback block 280 to produce channel quality information feedback 215.

Channel estimation block 255 may employ any number algorithms known in the art including least squares, maximum likelihood, maximum a postiori, Bayes estimator, adaptive estimator, or a blind estimator. Some algorithms exploit known information inserted into the transmit signal in the form of training signals, training pilots, while others use structure in the transmitted signal such as cyclostationarity to estimate coefficients of the channel between the BS and the MS.

Estimate SINR block 260 outputs some measure of performance corresponding to the desired signal. In one embodiment this consists of a received signal power to interference plus noise estimate. In another embodiment, it provides an estimate of the received signal-to-noise ratio. In yet another embodiment, it provides an estimate of the average received signal power, averaged over subcarriers in an OFDM system.

Figure 3A:
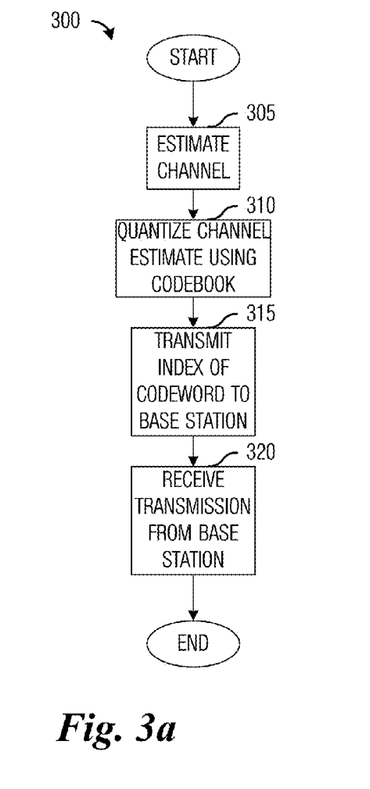
FIG. 3a is a flow diagram of MS operations in providing CSI to a BS.

FIG. 3a illustrates a flow diagram of MS operations 300 in providing CSI to a BS. MS operations 300 may be indicative of operations occurring in a MS, such as MS 203, as the MS provides CSI to a BS, such as BS 201. MS operations 203 may occur periodically while the MS is in a normal operating mode after the MS has become attached to the BS. MS operations 300 may continue for as long as the MS remains attached to the BS. In an alternative embodiment, MS operations 300 may occur after the MS receives a message from the BS indicating that the MS should provide CSI to the BS.

MS operations 300 may begin with the MS estimating a communications channel between itself and the BS that is serving it to produce a channel estimate (block 305). After estimating the channel, the MS may then quantize the channel estimate using a codebook (block 310). The codebook may be known at both the MS and the BS. The channel estimate may be normalized prior to being quantized. The MS may then transmit an index corresponding to the quantized channel estimate (i.e., the codeword) to the BS (block 315). The MS may then receive a transmission from the BS, wherein the transmission may make use of the channel estimate provided by the MS (block 320). MS operations 300 may then terminate.

Figure 3B:
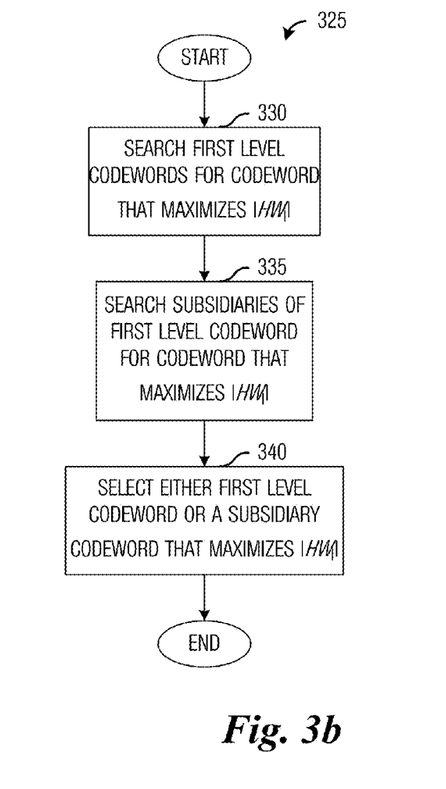
FIG. 3b is a flow diagram of MS operations in quantizing a channel estimate using a codebook.

FIG. 3b illustrates a flow diagram of MS operations 325 in quantizing a channel estimate using a codebook. MS operations 325 may be indicative of operations occurring in a MS, such as MS 203, as the MS provides CSI to a BS, such as BS 201. MS operations 325 may occur each time that the MS provides CSI to the BS, which may occur periodically or on command from the BS. MS operations 325 may be an implementation of block 310 of FIG. 3a, quantizing a channel estimate using a codebook.

MS operations 325 may begin after the MS has estimated the communications channel between itself and the BS that is serving it. The MS may estimate the communications channel by measuring a pilot sequence or a reference sequence transmitted by the BS. Alternatively, the MS may measure the transmissions made by the BS over an extended period of time. With the channel estimate, the MS may search among a first level of codewords in the codebook for a codeword that produces a best solution for a codeword selection mechanism, $F_{CS}(W)$ (block 330).

A best solution for the codeword selection mechanism may be based on the codeword selection mechanism itself. For example, a best solution for a first codeword selection mechanism may be one that minimizes the first codeword selection mechanism, while a best solution for a second codeword selection mechanism may be one that maximizes the second codeword selection mechanism. According to an embodiment, a codeword selection mechanism may be maximizing $|HW_i|$, $i \in [1, \ldots, \# \text{codewords}]$, where H is a channel matrix, and $W_i$ are codewords of the codebook W.

According to another embodiment, a codeword selection mechanism may be singular vector quantization based (SVD). With SVD, the channel matrix H may be expressed as:

$$H = UDV^H,$$

where $$V = [v, \ldots, v_{n_T}],$$

where $n_T$ is the number of transmit antennas. With SVD, a possible codeword selection mechanism may be expressed as:

$$F_{CS} = \max |v_1 w|,$$

where w are the codewords.

According to another embodiment, if interference is known, then a minimum mean squared error (MMSE) based codeword selection mechanism may be used. A possible codeword selection mechanism may be expressed as:

$$F_{CS} = \arg\min(w'H^H Hw + w'H_I^H H_I w + SNR^* I)^{-1} H^H,$$

where $H_I$ is an interference channel.

According to another embodiment, if interference is known, then a zero forcing based codeword selection mechanism may be used. A possible codeword selection mechanism may be expressed as:

$$F_{CS} = \arg\max |H(H_I^H H_I)^{-1} H_I^H w|.$$

For example, let W be a 6-bit codebook of 64 codewords, then each codeword index consists of $\log_2(64)=6$ bits. A selected codeword, denoted $W_s$, may be expressed as:

$$W_s = F_{CS}(W).$$

The 6-bit codebook, W, may be expressible as:

$$W = D \times [W_1; \ldots; W_{64}],$$

in which $$W_i, i \in [1, \ldots, 64]$$

is an i-th codeword and D is the phase rotation diagonal matrix given by:

$$D = \begin{bmatrix} e^{j\theta_1} & 0 & \cdots & 0 \\ 0 & e^{j\theta_2} & \ddots & \vdots \\ \vdots & \ddots & \ddots & 0 \\ 0 & \cdots & 0 & e^{j\theta_{64}} \end{bmatrix}, \text{ where } \theta_i \in [0, 2\pi), i \in [1, \ldots, 64].$$

The binary index of $W_i$ may be denoted by index(i), $i \in [1, \ldots, 64]$. For example, for rank 1 eigen-beamforming, the codeword selection mechanism $F_{CS}(W)$ may be defined as:

$$F_{CS}(W) = \max(|HW_i|, i \in [1, \ldots, 64]),$$

where H denotes a generic channel matrix.

With codebook W as defined above, there may be a first level of codewords in codebook W, wherein the first level of codewords in codebook W are codewords $[W_1, W_5, W_9, W_{13}, W_{17}, W_{21}, W_{25}, W_{29}, W_{33}, W_{37}, W_{41}, W_{45}, W_{49}, W_{53}, W_{57}, W_{61}]$. In general, the first level of codewords in the codebook may be denoted $W_{4k+1}, k \in [0, \ldots, 15]$.

For each first level codeword in the codebook W, there may be a plurality of subsidiary codewords. It may be defined that the subsidiary codewords of the first level codewords $W_{4k+1}$, $k \in [0, \ldots, 15]$ are $[W_{4k+2}, W_{4k+3}, W_{4k+4}]$.

For the discussion below, the codeword selection mechanism $F_{CS}(W)$ may be defined as $F_{CS}(W) = \max(|HW_i|, i \in [1, \ldots 64])$. However, any codeword selection mechanism may be used with the embodiments discussed herein. Therefore, the discussion of $F_{CS}(W) = \max(|HW_i|, i \in [1, \ldots, 64])$ should not be construed as being limiting to either the scope or the spirit of the embodiments.

In block 330, if $F_{CS}(W) = \max(|HW_i|, i \in [1, \ldots, 64])$, then the first level codewords corresponding to the M (a non-negative integer value) largest $|HW_{4k+1}|$ are denoted by $[W_1, W_5, \ldots, W_{4M+1}]$, with assumption that that $|HW_1| \geq |HW_2| \geq \ldots \geq |HW_{61}|$.

After selecting a codeword from the first level of codewords in codebook W that maximizes $|HW_i|, i \in [1, \ldots, \#\text{first level codewords}]$, the MS may search in the subsidiary codewords of the first level codeword(s) that maximized $|HW_i|, i \in [1, \ldots, \#\text{first level codewords}]$ (block 335). For example, if $W_{29}$ maximizes $|HW_i|, i \in [1, \ldots, \#\text{first level codewords}]$, then the subsidiary codewords of $W_{29}$, namely $W_{30}, W_{31},$ and $W_{32}$, will be searched. Although the discussion focuses on the selection of a single first level codeword, it may be possible to select multiple first level codewords. For example, M first level codewords may be selected, wherein the M first level codewords selected may correspond to first level codewords that resulted in the M maximum values of $|HW_i|, i \in [1, \ldots, \#\text{first level codewords}]$.

When M first level codewords are selected, then the MS may search through the plurality of subsidiary codewords of each of the M first level codewords for a subsidiary codeword(s) that may maximize $|HW_i|, i \in [1, \ldots, \#\text{subsidiary codewords}]$ for each of the M selected first level codewords.

The codeword that is selected as the quantized version of the channel estimate, i.e., either the codeword from the first level of codewords or one of its subsidiary codewords, is the codeword that maximizes $|HW_i|, i \in [1, \ldots, 64]$ (block 340). According to an embodiment, if the codeword from the first level of codewords and one (or more) of its subsidiary codeword substantially equally maximizes $|HW_i|, i \in [1, \ldots, 64]$, then the codeword from the first level of codewords is selected. According to an alternate embodiment, the codeword is selected at random if more than one codeword (first level and/or subsidiary) substantially equally maximizes $|HW_i|, i \in [1, \ldots, 64]$. MS operations 325 may then terminate.

The quantization of the channel estimate may also occur in two stages. In a first stage, a potentially sub-ideal quantization of the channel estimate may be obtained and in a second stage a potentially more accurate quantization of the channel estimate may be obtained. The two-stage quantization of the channel estimate may reduce a total number of codewords searched in the quantization process. For example, a typical quantization process may involve searching all first level codewords (16 searches) and the plurality of subsidiary codewords of a selected first level codeword (three searches) for a total of 19 searches rather than a complete search of the 64 codeword codebook.

Figure 3C:
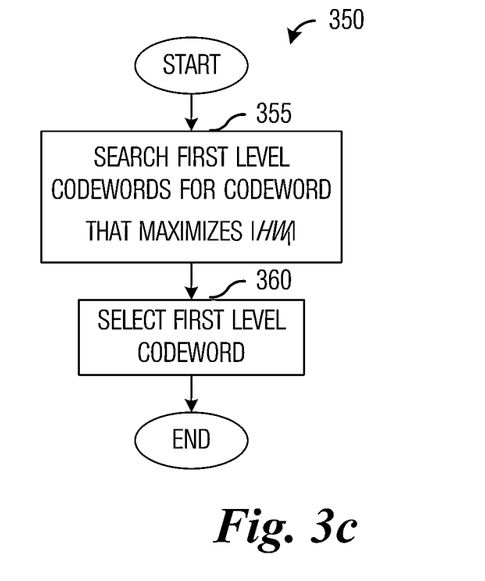
FIG. 3c is a flow diagram of MS operations in a first stage of a two-stage quantization of a channel estimate using a codebook.

FIG. 3c illustrates a flow diagram of MS operations 350 in a first stage of a two-stage quantization of a channel estimate using a codebook. MS operations 350 may be indicative of operations occurring in a MS, such as MS 203, as the MS provides CSI to a BS, such as BS 201. MS operations 350 may occur each time that the MS provides CSI to the BS, which may occur periodically or on command from the BS. MS operations 350 may be an implementation of block 310 of FIG. 3a, quantizing a channel estimate using a codebook.

MS operations 350 may begin with the MS searching among the first level codewords in the codebook for a codeword that results in a best solution of a codeword selection mechanism, such as $|HW_i|, i \in [1, \ldots, \#\text{first level codewords}]$ (block 355). The MS may then select the codeword in the first level of codewords that maximizes $|HW_i|, i \in [1, \ldots, \#\text{first level codewords}]$ as a first-stage quantization of the channel estimate (block 360). MS operations 350 may then terminate.

Figure 3D:
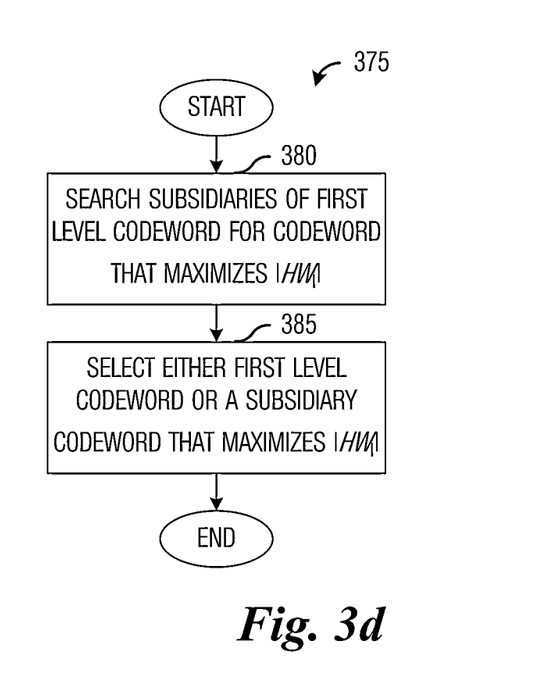
FIG. 3d is a flow diagram of MS operations in a second stage of a two-stage quantization of a channel estimate using a codebook.

FIG. 3d illustrates a flow diagram of MS operations 375 in a second stage of a two-stage quantization of a channel estimate using a codebook. MS operations 375 may be indicative of operations occurring in a MS, such as MS 203, as the MS provides CSI to a BS, such as BS 201. MS operations 375 may occur each time that the MS provides CSI to the BS, which may occur periodically or on command from the BS. MS operations 375 may be an implementation of block 310 of FIG. 3a, quantizing a channel estimate using a codebook.

MS operations 375 may begin with the MS searching in the subsidiary codewords of the codeword selected in the first level of codewords that maximizes $|HW_i|$, $i \in [1, \ldots, \# \text{ first level codewords}]$ for a codeword that maximizes $|HW_i|$, $i \in [1, \ldots, \# \text{ subsidiary codewords}]$ (block 380). In addition to the subsidiary codewords, the MS may also include in its search the codeword in the first level of codewords that maximizes $|HW_i|$, $i \in [1, \ldots, \# \text{ first level codewords}]$. The MS may then select either the first level codeword that maximizes $|HW_i|$, $i \in [1, \ldots, \# \text{ first level codewords}]$ (the first level codeword selected in the first stage of the two-stage quantization of a channel estimate) or one of its subsidiary codewords as a second-stage quantization of the channel estimate (block 385). MS operations 375 may then terminate.

Figure 4:
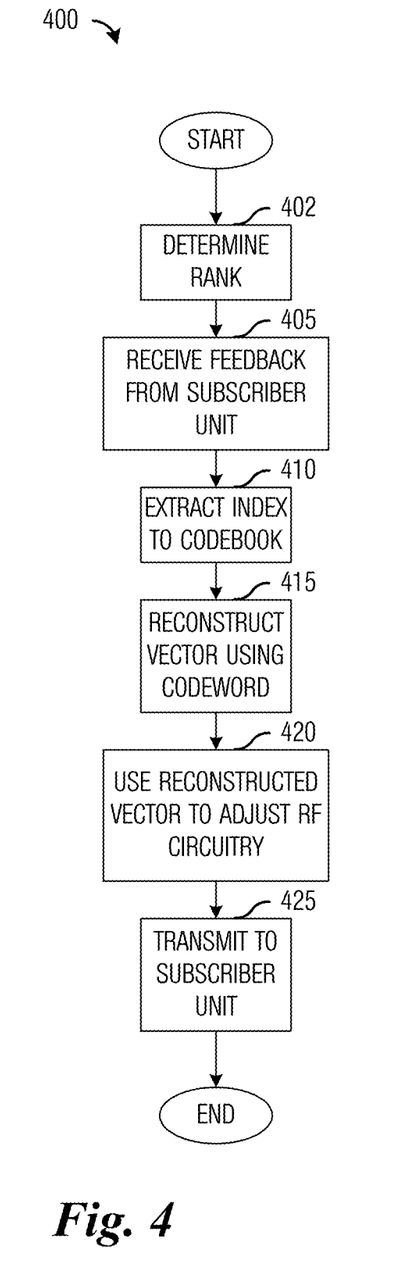
FIG. 4 is a flow diagram of BS operations in transmitting information to a MS.

FIG. 4 illustrates a flow diagram of BS operations 400 in transmitting information to a MS. BS operations 400 may be indicative of operations occurring in a BS, such as BS 201, as the BS receives CSI from a MS, such as MS 203, and makes use of the received CSI to improve the performance of transmissions to the MS. BS operations 400 may occur periodically, when the BS detects that a metric of transmission performance, such as an error rate (e.g., bit-error rate, frame error rate, packet error rate, and so forth) has reached a threshold, when the BS has a transmission to make to the MS, or so on.

BS operations 400 may begin with the BS determining a rank of MIMO operation (block 402). For example, the BS may determine to communicate using rank 1 MIMO operation or rank 2 MIMO operation. According to an embodiment, a MS communicating with the BS may suggest a rank, however, the BS may have the ability to accept the rank suggested by the MS or reject the rank suggested by the MS and specify a rank on its own. For example, since the BS may know channel conditions for all of the MSs that it is serving while the MS only knows the channel condition for its own communications channel, the BS may be able to more accurately determine a rank that will result in better overall performance.

According to an embodiment, the BS may make use of information regarding channel conditions provided by the MSs that it is serving to determine the rank of MIMO operation. In addition, the BS may perform computations using codewords in the codebook W (both the rank 1 codebook and the rank 2 codebook) to determine the rank of MIMO operation. Due to a nested property of the codebook W, computations using rank 1 codebook codewords may be reused in computations using rank 2 codebook codewords, thereby reducing computational requirements of determining the rank of MIMO operation. Once the BS determines the rank of MIMO operation, the BS may send an indicator of the rank to the MSs that it is serving.

Since determining the rank of MIMO operation may involve a considerable number of computations, and generally, channel conditions do not change rapidly, rank determination may occur periodically at specified times. Alternatively, determining the rank of MIMO operation may be triggered when a specified event is detected. For example, events that may trigger determining the rank of MIMO operation may include an overall performance level dropping below a threshold, an error rate (such as bit-error rate, frame-error rate, packet-error rate, and so on) exceeding a threshold, an inability to meet a quality of service restriction, a number of MSs suggesting a higher rank than a current rank exceeding a threshold, or so forth.

BS operations 400 may then continue with the BS receiving feedback information from the MS (block 405). The feedback information may include quantized CSI. The quantized CSI comprises an index to a codebook, wherein the index corresponds to a codeword in the codebook that most closely matches a channel estimate of a communications channel between the BS and the MS. According to an embodiment, the codeword is a codeword from the codebook that provides a best solution to a codeword selection mechanism $F_{CS}(W)$, e.g., maximizes the relationship $|HW_i|$, $i \in [1, \ldots, \# \text{ codewords}]$, where H is a channel matrix, and W are codewords of the codebook. The codeword may correspond to a first level codeword or to a subsidiary of a first level codeword.

The BS extracts the index from the feedback information (block 410) and reconstructs the channel estimate vector using the codeword from the codebook that corresponds to the index (block 415). As stated previously, both the BS and the MS have copies of the same codebook. The BS may then use the reconstructed channel estimate vector to adjust radio frequency (RF) hardware in the BS (block 420). The BS may make use of the adjusted RF hardware to transmit to the MS (block 425). BS operations 400 may then terminate.

According to a preferred embodiment, the codebook used in CSI quantization may depend on the MIMO operation mode, i.e., rank. A rank-1 codebook W may be used when the MS and the BS are communicating with rank-1 MIMO operation mode, while when the MS and the BS are communicating with rank-2 MIMO operating mode, a rank-2 codebook W may be used.

Table 1 displays a rank-1 codebook W with four decimal place precision.

TABLE 1

| Rank-1 Codebook with Precision of Four | | | | | |
|---|---|---|---|---|---|
| Binary Index | i | | $W_i$ | | |
| 000000 | 1 | 0.5000 | −0.5000 | 0.5000 | −0.5000 |
| 010000 | 2 | 0.5000 | −0.4619 − 0.1913i | 0.3536 + 0.3536i | −0.1913 − 0.4619i |
| 100000 | 3 | 0.5636 | −0.3332 − 0.2672i | 0.1174 + 0.5512i | −0.3308 − 0.2702i |
| 110000 | 4 | 0.5000 | −0.4619 + 0.1913i | 0.3536 − 0.3536i | −0.1913 + 0.4619i |
| 000001 | 5 | 0.5000 | 0.5000 | −0.5000 | −0.5000 |
| 010001 | 6 | 0.3117 | 0.6025 + 0.1995i | −0.4030 − 0.4903i | −0.1122 − 0.2908i |
| 100001 | 7 | 0.5587 | 0.3361 + 0.2735i | −0.3361 − 0.2735i | −0.1135 − 0.5471i |
| 110001 | 8 | 0.3117 | 0.4030 + 0.4903i | −0.6025 − 0.1995i | −0.1122 − 0.2908i |
| 000010 | 9 | 0.5000 | −0.5000 | −0.5000 | 0.5000 |
| 010010 | 10 | 0.3117 | −0.6025 − 0.1995i | −0.1122 − 0.2908i | 0.4030 + 0.4903i |
| 100010 | 11 | 0.5587 | −0.3361 − 0.2735i | −0.1135 − 0.5471i | 0.3361 + 0.2735i |
| 110010 | 12 | 0.3117 | −0.4029 − 0.4904i | −0.1184 − 0.2883i | 0.6067 + 0.1865i |
| 000011 | 13 | 0.5000 | 0.0000 − 0.5000i | 0.5000 | 0.0000 − 0.5000i |

TABLE 1-continued

Rank-1 Codebook with Precision of Four

| Binary Index | i | | $W_i$ | | |
|---|---|---|---|---|---|
| 010011 | 14 | 0.3058 | 0.1901 − 0.6052i | 0.1195 + 0.2866i | 0.4884 − 0.4111i |
| 100011 | 15 | 0.5587 | 0.2735 − 0.3361i | 0.1135 + 0.5471i | 0.2735 − 0.3361i |
| 110011 | 16 | 0.3082 | 0.4887 − 0.4077i | 0.1205 + 0.2837i | 0.1842 − 0.6092i |
| 000100 | 17 | 0.5000 | 0.0000 + 0.5000i | −0.5000 | 0.0000 − 0.5000i |
| 010100 | 18 | 0.5000 | −0.1913 + 0.4619i | −0.3536 − 0.3536i | 0.4619 − 0.1913i |
| 100100 | 19 | 0.3082 | −0.4887 + 0.4077i | −0.6092 − 0.1842i | 0.2837 − 0.1205i |
| 110100 | 20 | 0.5000 | 0.1913 + 0.4619i | −0.3536 + 0.3536i | −0.4619 − 0.1913i |
| 000101 | 21 | 0.5000 | 0.0000 − 0.5000i | −0.5000 | 0.0000 + 0.5000i |
| 010101 | 22 | 0.5000 | 0.1913 − 0.4619i | −0.3536 − 0.3536i | −0.4619 + 0.1913i |
| 100101 | 23 | 0.5636 | 0.2673 − 0.3331i | −0.1222 − 0.5501i | −0.2673 + 0.3331i |
| 110101 | 24 | 0.5000 | −0.1913 − 0.4619i | −0.3536 + 0.3536i | 0.4619 + 0.1913i |
| 000110 | 25 | 0.5000 | 0.5000 | 0.5000 | 0.5000 |
| 010110 | 26 | 0.5000 | 0.4619 + 0.1913i | 0.3536 − 0.3536i | 0.1913 + 0.4619i |
| 100110 | 27 | 0.5636 | 0.3691 + 0.5142i | 0.3331 + 0.2673i | 0.0862 + 0.3032i |
| 110110 | 28 | 0.5000 | 0.4619 − 0.1913i | 0.3536 − 0.3536i | 0.1913 − 0.4619i |
| 000111 | 29 | 0.5000 | 0.0000 + 0.5000i | 0.5000 | 0.0000 + 0.5000i |
| 010111 | 30 | 0.3082 | 0.0104 + 0.3151i | 0.4077 + 0.4887i | −0.4783 + 0.4145i |
| 100111 | 31 | 0.5587 | −0.2990 + 0.0880i | 0.3361 + 0.2735i | −0.5216 + 0.3616i |
| 110111 | 32 | 0.3117 | −0.2452 + 0.3573i | 0.6025 + 0.1995i | −0.5360 + 0.1578i |
| 001000 | 33 | 0.5000 | 0.5000 | 0.5000 | −0.5000 |
| 011000 | 34 | 0.3117 | 0.3573 − 0.2452i | 0.6025 − 0.1995i | −0.1578 + 0.5360i |
| 101000 | 35 | 0.5587 | 0.0880 − 0.2990i | 0.3361 − 0.2735i | −0.3616 + 0.5216i |
| 111000 | 36 | 0.3117 | 0.3117 − 0.0000i | 0.4030 − 0.4903i | −0.4030 + 0.4903i |
| 001001 | 37 | 0.5000 | 0.0000 + 0.5000i | −0.5000 | 0.0000 + 0.5000i |
| 011001 | 38 | 0.3117 | 0.2452 + 0.3573i | −0.6025 + 0.1995i | 0.5360 + 0.1578i |
| 101001 | 39 | 0.5587 | 0.2990 + 0.0881i | −0.3362 + 0.2735i | 0.5216 + 0.3616i |
| 111001 | 40 | 0.3117 | −0.0000 + 0.3117i | −0.4030 + 0.4903i | 0.4903 + 0.4030i |
| 001010 | 41 | 0.5000 | −0.5000 | 0.5000 | 0.5000 |
| 011010 | 42 | 0.3082 | −0.3666 + 0.2426i | 0.6092 − 0.1842i | 0.1615 − 0.5298i |
| 101010 | 43 | 0.5587 | −0.0880 + 0.2990i | 0.3361 − 0.2735i | 0.3616 − 0.5216i |
| 111010 | 44 | 0.3082 | −0.3152 − 0.0036i | 0.4076 − 0.4888i | 0.4040 − 0.4872i |
| 001011 | 45 | 0.5000 | 0.0000 − 0.5000i | −0.5000 | 0.0000 − 0.5000i |
| 011011 | 46 | 0.3117 | −0.2452 − 0.3573i | −0.6025 + 0.1995i | −0.5360 − 0.1578i |
| 101011 | 47 | 0.5587 | −0.2990 − 0.0880i | −0.3361 + 0.2735i | −0.5216 − 0.3616i |
| 111011 | 48 | 0.3082 | 0.0036 − 0.3152i | −0.4076 + 0.4888i | −0.4872 − 0.4040i |
| 001100 | 49 | 0.5000 | 0.3536 + 0.3536i | 0.0000 + 0.5000i | −0.3536 + 0.3536i |
| 011100 | 50 | 0.3117 | 0.4260 + 0.0793i | 0.1995 + 0.6025i | 0.2674 + 0.4906i |
| 101100 | 51 | 0.5636 | 0.2741 − 0.1559i | 0.2672 + 0.3332i | 0.1081 + 0.6236i |
| 111100 | 52 | 0.3117 | 0.2204 + 0.2204i | 0.4903 + 0.4030i | 0.0618 + 0.6317i |
| 001101 | 53 | 0.5000 | −0.3536 + 0.3536i | 0.0000 − 0.5000i | 0.3536 + 0.3536i |
| 011101 | 54 | 0.3117 | −0.0793 + 0.4260i | −0.1995 − 0.6025i | 0.4906 − 0.2674i |
| 101101 | 55 | 0.5636 | 0.1559 + 0.2741i | −0.2672 − 0.3332i | 0.6236 − 0.1081i |
| 111101 | 56 | 0.3117 | −0.2204 + 0.2204i | −0.4903 − 0.4030i | 0.6317 − 0.0618i |
| 001110 | 57 | 0.5000 | −0.3536 − 0.3536i | 0.0000 + 0.5000i | 0.3536 − 0.3536i |
| 011110 | 58 | 0.3117 | −0.4260 − 0.0793i | 0.1995 + 0.6025i | −0.2674 − 0.4906i |
| 101110 | 59 | 0.5587 | −0.2737 + 0.1492i | 0.2735 + 0.3361i | −0.1132 − 0.6245i |
| 111110 | 60 | 0.3082 | −0.2154 − 0.2302i | 0.4887 + 0.4077i | −0.0451 − 0.6313i |
| 001111 | 61 | 0.5000 | 0.3536 − 0.3536i | 0.0000 − 0.5000i | −0.3536 − 0.3536i |
| 011111 | 62 | 0.3117 | 0.0793 − 0.4260i | −0.1995 − 0.6025i | −0.4906 + 0.2674i |
| 101111 | 63 | 0.5587 | −0.1492 − 0.2737i | −0.2735 − 0.3361i | −0.6245 + 0.1132i |
| 111111 | 64 | 0.3082 | 0.2254 − 0.2204i | −0.4888 − 0.4076i | −0.6302 + 0.0588i |

Table 2 displays a rank-2 codebook W formed from codewords of the rank-1 codebook W.

TABLE 2

Rank-2 Codebook $W_m^2 = [W_i; W_j]$ with Precision of Four

| index | m | i, j |
|---|---|---|
| 000000 | 1 | 1, 5 |
| 000001 | 2 | 1, 7 |
| 000010 | 3 | 1, 9 |
| 000011 | 4 | 1, 17 |
| 000100 | 5 | 1, 21 |
| 000101 | 6 | 1, 25 |
| 000110 | 7 | 3, 11 |
| 000111 | 8 | 5, 11 |
| 001000 | 9 | 5, 13 |
| 001001 | 10 | 5, 25 |
| 001010 | 11 | 5, 29 |
| 001011 | 12 | 5, 32 |
| 001100 | 13 | 5, 9 |
| 001101 | 14 | 6, 9 |
| 001110 | 15 | 6, 13 |
| 001111 | 16 | 8, 25 |
| 010000 | 17 | 9, 13 |
| 010001 | 18 | 9, 25 |
| 010010 | 19 | 9, 29 |
| 010011 | 20 | 9, 31 |
| 010100 | 21 | 10, 14 |
| 010101 | 22 | 10, 25 |
| 010110 | 23 | 11, 15 |
| 010111 | 24 | 13, 17 |
| 011000 | 25 | 13, 21 |
| 011001 | 26 | 15, 29 |
| 011010 | 27 | 17, 25 |

TABLE 2-continued

Rank-2 Codebook $W_m^2 = [W_i; W_j]$ with Precision of Four

| index | m | i, j |
|---|---|---|
| 011011 | 28 | 17, 29 |
| 011100 | 29 | 20, 24 |
| 011101 | 30 | 21, 25 |
| 011110 | 31 | 21, 29 |
| 011111 | 32 | 21, 30 |
| 100000 | 33 | 33, 37 |
| 100001 | 34 | 33, 45 |
| 100010 | 35 | 33, 46 |
| 100011 | 36 | 33, 41 |
| 100100 | 37 | 34, 37 |
| 100101 | 38 | 35, 45 |
| 100110 | 39 | 36, 41 |
| 100111 | 40 | 36, 44 |
| 101000 | 41 | 37, 41 |
| 101001 | 42 | 37, 43 |
| 101010 | 43 | 38, 41 |
| 101011 | 44 | 39, 47 |
| 101100 | 45 | 40, 45 |
| 101101 | 46 | 40, 48 |
| 101110 | 47 | 41, 45 |
| 101111 | 48 | 41, 47 |
| 110000 | 49 | 49, 53 |
| 110001 | 50 | 49, 57 |
| 110010 | 51 | 49, 61 |
| 110011 | 52 | 49, 62 |
| 110100 | 53 | 50, 53 |
| 110101 | 54 | 51, 59 |
| 110110 | 55 | 52, 57 |
| 110111 | 56 | 53, 57 |
| 111000 | 57 | 53, 61 |
| 111001 | 58 | 54, 57 |
| 111010 | 59 | 55, 63 |
| 111011 | 60 | 56, 61 |
| 111100 | 61 | 56, 64 |
| 111101 | 62 | 57, 61 |
| 111110 | 63 | 57, 63 |
| 111111 | 64 | 58, 61 |

As shown in Table 2, a codeword in the rank 2 codebook comprises two rank 1 codebook codewords. For example, codeword 3 of the rank 2 codebook, $W_3^2$, comprises codewords 1 ($W_1$) and 9 ($W_9$) of the rank 1 codebook shown in Table 1, and may be expressed as:

$$W_3^2 = [W_1; W_9] = [[0.5000\ -0.5000\ 0.5000\ -0.5000];\\ [0.5000\ -0.5000\ -0.5000\ 0.5000]].$$

Although the rank-1 and the rank-2 codebooks are shown with four decimal place precision, the properties of the codebooks remain with any decimal place precision, including one, two, three, four, five, and so forth. Furthermore, reordering the elements of the codewords in the codebooks do not change the properties of the codebooks. Additionally, applying a rotational matrix to the codebooks also do not change the properties of the codebooks.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a communications device, the method comprising:
    estimating a communications channel between the communications device and a controller serving the communications device to produce a channel estimate; and
    quantizing the channel estimate using a codebook to produce a selected codeword, wherein the codebook has a hierarchical structure and comprises a plurality of first level codewords and a plurality of sets of subsidiary codewords, wherein the sets of subsidiary codewords do not include any of the first level codewords, wherein each first level codeword corresponds to a unique one of the plurality of sets of subsidiary codewords, and wherein quantizing the channel estimate using a codebook comprises identifying M first level codewords out of the plurality of first level codewords, where M is a non-zero integer value greater than or equal to two.

2. The method of claim 1, wherein quantizing the channel estimate using a codebook comprises:
    identifying one of the plurality of first level codewords that provides a best solution to a codeword selection mechanism;
    identifying a subsidiary codeword that provides a best solution to the codeword selection mechanism from the one or more sets of subsidiary codewords corresponding to the identified first level codeword; and
    selecting either the identified first level codeword or the identified subsidiary codeword based on which codeword provides the best solution to the codeword selection mechanism as the selected codeword.

3. The method of claim 2, wherein selecting either the identified first level codeword or the identified subsidiary codeword as the selected codeword comprises selecting the identified first level codeword as the selected codeword in response to determining that the identified first level codeword and the identified subsidiary codeword provide substantially equivalent solutions to the codeword selection mechanism.

4. The method of claim 2, wherein selecting either the identified first level codeword or the identified subsidiary codeword comprises randomly selecting either the identified first level codeword or the identified subsidiary codeword in response to determining that the identified first level codeword and the identified subsidiary codeword provide substantially equivalent solutions to the codeword selection mechanism.

5. The method of claim 2, wherein the codeword selection mechanism is $|HW_i|$, $i \in [1, \ldots, \#$ codewords], and wherein a best solution maximizes the codeword selection mechanism.

6. The method of claim 1, wherein the M identified first level codewords provide the M best solutions to the codeword selection mechanism out of the plurality of first level codewords.

7. The method of claim 6, wherein quantizing the channel estimate using a codebook further comprises identifying one or more subsidiary codewords from those M sets of subsidiary codewords corresponding to the M identified first level codewords, wherein the one or more identified subsidiary codewords provide the M best solutions the codeword selection mechanism from out of those M sets of subsidiary codewords.

8. The method of claim 1, wherein the number of subsidiary codewords in each set of subsidiary codewords is equal.

9. A method for controller operation, the method comprising:
receiving a channel state information (CSI) from a communications device, wherein the CSI comprises an index to a codeword in a codebook, wherein the codebook has a hierarchical structure and comprises a plurality of first level codewords and a plurality of sets of subsidiary codewords, the plurality of first level codewords including at least M first level codewords, where M is a non-zero integer value greater than or equal to two, wherein the sets of subsidiary codewords do not include any first level codewords, and wherein each first level codeword corresponds to a unique one of the plurality of sets of subsidiary codewords.

10. The method of claim 9, wherein the codebook is based on a rank of communications between the communications device and the controller, and wherein the method further comprises:
reconstructing a channel estimate using the codebook and the index;
adjusting transmission circuitry in the controller using the reconstructed first channel estimate; and
transmitting a transmission to the communications device using the adjusted transmission circuitry.

11. The method of claim 9, further comprising determining a rank of communications between the controller and the communications device.

12. The method of claim 11, further comprising sending an indicator of the rank to the communications device.

13. The method of claim 11, wherein the rank is either rank 1 or rank 2, and wherein the codebook is either a rank 1 codebook or a rank 2 codebook based on the rank.

14. The method of claim 10, wherein transmitting a transmission comprises:
precoding the transmission with the reconstructed channel estimate to produce a precoded transmission, and
transmitting the precoded transmission to the communications device.

15. The method of claim 1, wherein the codebook is based on a rank of communications between the communications device and the controller, and wherein the method further comprises transmitting an index corresponding to the selected codeword from the codebook to the controller.

16. A method for operating a base station, the method comprising:
taking a channel measurement; and
quantizing the channel measurement using a codebook to produce a selected codeword, the codebook comprising a hierarchical structure consisting of sixteen codeword clusters each of which comprising four codewords, wherein quantizing the channel estimate using a codebook comprises identifying M first level codewords out of the plurality of first level codewords, where M is a non-zero integer value greater than or equal to two, and wherein a first codeword in each of the sixteen codeword clusters is a Layer-1 codeword and the remaining three codewords in each of the sixteen codeword clusters are Layer-2 codewords, the Layer-2 codewords not being Layer-1 codewords.

17. The method of claim 16, wherein each Layer-2 codeword of a given codeword cluster corresponds to the Layer-1 codeword of the given codeword cluster to a greater degree than the Layer-1 codewords of other codeword clusters due to the hierarchical structure of the codebook.

18. The method of claim 16 further comprising:
identifying one or more Layer-1 codewords that satisfy a criterion by searching only Layer-1 codewords in the codebook;
identifying one or more Layer-2 codewords that satisfy the criterion by searching only those Layer-2 codewords within codeword clusters corresponding to the one or more identified Layer-1 codewords; and
selecting the selected codeword from the one or more identified Layer-1 codewords and the one or more identified Layer-2 codewords.

19. The method of claim 16, wherein the controller comprises four transmit antennas, and wherein the codebook is expressible as:

$$W = D \times [W_1; \ldots; W_{64}],$$

where D is the phase rotation diagonal matrix and given by $$D = \begin{bmatrix} e^{j\theta_1} & 0 & \cdots & 0 \\ 0 & e^{j\theta_2} & \ddots & \vdots \\ \vdots & \ddots & \ddots & 0 \\ 0 & \cdots & 0 & e^{j\theta_{64}} \end{bmatrix},$$

where $\theta_i \in [0, 2\pi)$, $i \in [1, \ldots, 64]$.

20. The method of claim 16, wherein the codebook comprises a rank-1 codebook expressible as:

| Index | m | | $W_m$ | | |
|---|---|---|---|---|---|
| 000000 | 1 | 0.5000 | −0.5000 | 0.5000 | −0.5000 |
| 000001 | 2 | 0.5000 | 0.5000 | −0.5000 | −0.5000 |
| 000010 | 3 | 0.5000 | −0.5000 | −0.5000 | 0.5000 |
| 000011 | 4 | 0.5000 | 0.0000 − 0.5000i | 0.5000 | 0.0000 − 0.5000i |
| 000100 | 5 | 0.5000 | 0.0000 + 0.5000i | −0.5000 | 0.0000 − 0.5000i |
| 000101 | 6 | 0.5000 | 0.0000 − 0.5000i | −0.5000 | 0.0000 + 0.5000i |
| 000110 | 7 | 0.5000 | 0.5000 | 0.5000 | 0.5000 |
| 000111 | 8 | 0.5000 | 0.0000 + 0.5000i | 0.5000 | 0.0000 + 0.5000i |
| 001000 | 9 | 0.5000 | 0.5000 | 0.5000 | −0.5000 |
| 001001 | 10 | 0.5000 | 0.0000 + 0.5000i | −0.5000 | 0.0000 + 0.5000i |
| 001010 | 11 | 0.5000 | −0.5000 | 0.5000 | 0.5000 |
| 001011 | 12 | 0.5000 | 0.0000 − 0.5000i | −0.5000 | 0.0000 − 0.5000i |
| 001100 | 13 | 0.5000 | 0.3536 + 0.3536i | 0.0000 + 0.5000i | −0.3536 + 0.3536i |
| 001101 | 14 | 0.5000 | −0.3536 + 0.3536i | 0.0000 − 0.5000i | 0.3536 + 0.3536i |
| 001110 | 15 | 0.5000 | −0.3536 − 0.3536i | 0.0000 + 0.5000i | 0.3536 − 0.3536i |
| 001111 | 16 | 0.5000 | 0.3536 − 0.3536i | 0.0000 − 0.5000i | −0.3536 − 0.3536i |
| 010000 | 17 | 0.5000 | −0.4619 − 0.1913i | 0.3536 + 0.3536i | −0.1913 − 0.4619i |
| 010001 | 18 | 0.3117 | 0.6025 + 0.1995i | −0.4030 − 0.4903i | −0.1122 − 0.2908i |
| 010010 | 19 | 0.3117 | −0.6025 − 0.1995i | −0.1122 − 0.2908i | 0.4030 + 0.4903i |
| 010011 | 20 | 0.3058 | 0.1901 − 0.6052i | 0.1195 + 0.2866i | 0.4884 − 0.4111i |
| 010100 | 21 | 0.5000 | −0.1913 + 0.4619i | −0.3536 − 0.3536i | 0.4619 − 0.1913i |
| 010101 | 22 | 0.5000 | 0.1913 − 0.4619i | −0.3536 − 0.3536i | −0.4619 + 0.1913i |
| 010110 | 23 | 0.5000 | 0.4619 + 0.1913i | 0.3536 + 0.3536i | 0.1913 + 0.4619i |

-continued

| Index | m | $W_m$ | | | |
|---|---|---|---|---|---|
| 010111 | 24 | 0.3082 | 0.0104 + 0.3151i | 0.4077 + 0.4887i | −0.4783 + 0.4145i |
| 011000 | 25 | 0.3117 | 0.3573 − 0.2452i | 0.6025 − 0.1995i | −0.1578 + 0.5360i |
| 011001 | 26 | 0.3117 | 0.2452 + 0.3573i | −0.6025 + 0.1995i | 0.5360 + 0.1578i |
| 011010 | 27 | 0.3082 | −0.3666 + 0.2426i | 0.6092 − 0.1842i | 0.1615 − 0.5298i |
| 011011 | 28 | 0.3117 | −0.2452 − 0.3573i | −0.6025 + 0.1995i | −0.5360 − 0.1578i |
| 011100 | 29 | 0.3117 | 0.4260 + 0.0793i | 0.1995 + 0.6025i | 0.2674 + 0.4906i |
| 011101 | 30 | 0.3117 | −0.0793 − 0.4260i | −0.1995 − 0.6025i | 0.4906 − 0.2674i |
| 011110 | 31 | 0.3117 | −0.4260 − 0.0793i | 0.1995 + 0.6025i | −0.2674 − 0.4906i |
| 011111 | 32 | 0.3117 | 0.0793 − 0.4260i | −0.1995 − 0.6025i | −0.4906 + 0.2674i |
| 100000 | 33 | 0.5636 | −0.3332 − 0.2672i | 0.1174 + 0.5512i | −0.3308 − 0.2702i |
| 100001 | 34 | 0.5587 | 0.3361 + 0.2735i | −0.3361 − 0.2735i | −0.1135 − 0.5471i |
| 100010 | 35 | 0.5587 | −0.3361 − 0.2735i | −0.1135 − 0.5471i | 0.3361 + 0.2735i |
| 100011 | 36 | 0.5587 | 0.2735 − 0.3361i | 0.1135 + 0.5471i | 0.2735 − 0.3361i |
| 100100 | 37 | 0.3082 | −0.4887 + 0.4077i | −0.6092 − 0.1842i | 0.2837 − 0.1205i |
| 100101 | 38 | 0.5636 | 0.2673 − 0.3331i | −0.1222 − 0.5501i | −0.2673 + 0.3331i |
| 100110 | 39 | 0.5636 | 0.3691 + 0.5142i | 0.3331 + 0.2673i | 0.0862 + 0.3032i |
| 100111 | 40 | 0.5587 | −0.2990 + 0.0880i | 0.3361 + 0.2735i | −0.5216 + 0.3616i |
| 101000 | 41 | 0.5587 | 0.0880 − 0.2990i | −0.3361 − 0.2735i | −0.3616 − 0.5216i |
| 101001 | 42 | 0.5587 | 0.2990 + 0.0881i | −0.3362 − 0.2735i | 0.5216 + 0.3616i |
| 101010 | 43 | 0.5587 | −0.0880 + 0.2990i | 0.3361 − 0.2735i | 0.3616 − 0.5216i |
| 101011 | 44 | 0.5587 | −0.2990 − 0.0880i | −0.3361 − 0.2735i | −0.5216 − 0.3616i |
| 101100 | 45 | 0.5636 | 0.2741 − 0.1559i | 0.2672 + 0.3332i | 0.1081 + 0.6236i |
| 101101 | 46 | 0.5636 | 0.1559 + 0.2741i | −0.2672 − 0.3332i | 0.6236 − 0.1081i |
| 101110 | 47 | 0.5587 | −0.2737 + 0.1492i | 0.2735 + 0.3361i | −0.1132 − 0.6245i |
| 101111 | 48 | 0.5587 | −0.1492 − 0.2737i | −0.2735 − 0.3361i | −0.6245 + 0.1132i |
| 110000 | 49 | 0.5000 | −0.4619 + 0.1913i | 0.3536 − 0.3536i | −0.1913 + 0.4619i |
| 110001 | 50 | 0.3117 | 0.4030 + 0.4903i | −0.6025 − 0.1995i | −0.1122 − 0.2908i |
| 110010 | 51 | 0.3117 | −0.4029 − 0.4904i | −0.1184 − 0.2883i | 0.6067 + 0.1865i |
| 110011 | 52 | 0.3082 | 0.4887 − 0.4077i | 0.1205 + 0.2837i | 0.1842 − 0.6092i |
| 110100 | 53 | 0.5000 | 0.1913 + 0.4619i | −0.3536 + 0.3536i | −0.4619 − 0.1913i |
| 110101 | 54 | 0.5000 | −0.1913 − 0.4619i | −0.3536 + 0.3536i | 0.4619 + 0.1913i |
| 110110 | 55 | 0.5000 | 0.4619 − 0.1913i | 0.3536 − 0.3536i | 0.1913 − 0.4619i |
| 110111 | 56 | 0.3117 | −0.2452 + 0.3573i | 0.6025 + 0.1995i | −0.5360 − 0.1578i |
| 111000 | 57 | 0.3117 | 0.3117 − 0.0000i | 0.4030 − 0.4903i | −0.4030 − 0.4903i |
| 111001 | 58 | 0.3117 | −0.0000 + 0.3117i | −0.4030 + 0.4903i | 0.4903 + 0.4030i |
| 111010 | 59 | 0.3082 | −0.3152 − 0.0036i | 0.4076 − 0.4888i | 0.4040 − 0.4872i |
| 111011 | 60 | 0.3082 | 0.0036 − 0.3152i | −0.4076 + 0.4888i | −0.4872 − 0.4040i |
| 111100 | 61 | 0.3117 | 0.2204 + 0.2204i | 0.4903 + 0.4030i | 0.0618 + 0.6317i |
| 111101 | 62 | 0.3117 | −0.2204 + 0.2204i | −0.4903 − 0.4030i | 0.6317 − 0.0618i |
| 111110 | 63 | 0.3082 | −0.2154 − 0.2302i | 0.4887 + 0.4077i | −0.0451 − 0.6313i |
| 111111 | 64 | 0.3082 | 0.2254 − 0.2204i | −0.4888 − 0.4076i | −0.6302 + 0.0588i | where m is an integer value and a codeword index, index is a binary codeword index, and $W_m$ is the m-th codeword.

21. The method of claim 16, wherein the codebook comprises a rank-1 codebook expressible as:

| Index | i | $W_i$ | | | |
|---|---|---|---|---|---|
| 000000 | 1 | 0.5000 | −0.5000 | 0.5000 | −0.5000 |
| 010000 | 2 | 0.5000 | −0.4619 − 0.1913i | 0.3536 + 0.3536i | −0.1913 − 0.4619i |
| 100000 | 3 | 0.5636 | −0.3332 − 0.2672i | 0.1174 + 0.5512i | −0.3308 − 0.2702i |
| 110000 | 4 | 0.5000 | −0.4619 + 0.1913i | 0.3536 − 0.3536i | −0.1913 + 0.4619i |
| 000001 | 5 | 0.5000 | 0.5000 | −0.5000 | −0.5000 |
| 010001 | 6 | 0.3117 | 0.6025 + 0.1995i | −0.4030 − 0.4903i | −0.1122 − 0.2908i |
| 100001 | 7 | 0.5587 | 0.3361 + 0.2735i | −0.3361 − 0.2735i | −0.1135 − 0.5471i |
| 110001 | 8 | 0.3117 | 0.4030 + 0.4903i | −0.6025 − 0.1995i | −0.1122 − 0.2908i |
| 000010 | 9 | 0.5000 | −0.5000 | −0.5000 | 0.5000 |
| 010010 | 10 | 0.3117 | −0.6025 − 0.1995i | −0.1122 − 0.2908i | 0.4030 + 0.4903i |
| 100010 | 11 | 0.5587 | −0.3361 − 0.2735i | −0.1135 − 0.5471i | 0.3361 + 0.2735i |
| 110010 | 12 | 0.3117 | −0.4029 − 0.4904i | −0.1184 − 0.2883i | 0.6067 + 0.1865i |
| 000011 | 13 | 0.5000 | 0.0000 − 0.5000i | 0.5000 | 0.0000 − 0.5000i |
| 010011 | 14 | 0.3058 | 0.1901 − 0.6052i | 0.1195 + 0.2866i | 0.4884 − 0.4111i |
| 100011 | 15 | 0.5587 | 0.2735 − 0.3361i | 0.1135 + 0.5471i | 0.2735 − 0.3361i |
| 110011 | 16 | 0.3082 | 0.4887 − 0.4077i | 0.1205 + 0.2837i | 0.1842 − 0.6092i |
| 000100 | 17 | 0.5000 | 0.0000 + 0.5000i | −0.5000 | 0.0000 − 0.5000i |
| 010100 | 18 | 0.5000 | −0.1913 + 0.4619i | −0.3536 − 0.3536i | 0.4619 − 0.1913i |
| 100100 | 19 | 0.3082 | −0.4887 + 0.4077i | −0.6092 − 0.1842i | 0.2837 − 0.1205i |
| 110100 | 20 | 0.5000 | 0.1913 + 0.4619i | −0.3536 + 0.3536i | −0.4619 − 0.1913i |
| 000101 | 21 | 0.5000 | 0.0000 − 0.5000i | −0.5000 | 0.0000 + 0.5000i |
| 010101 | 22 | 0.5000 | 0.1913 − 0.4619i | −0.3536 − 0.3536i | −0.4619 + 0.1913i |
| 100101 | 23 | 0.5636 | 0.2673 − 0.3331i | −0.1222 − 0.5501i | −0.2673 + 0.3331i |
| 110101 | 24 | 0.5000 | −0.1913 − 0.4619i | −0.3536 + 0.3536i | 0.4619 + 0.1913i |
| 000110 | 25 | 0.5000 | 0.5000 | 0.5000 | 0.5000 |
| 010110 | 26 | 0.5000 | 0.4619 + 0.1913i | 0.3536 + 0.3536i | 0.1913 + 0.4619i |
| 100110 | 27 | 0.5636 | 0.3691 + 0.5142i | 0.3331 + 0.2673i | 0.0862 + 0.3032i |

-continued

| Index | i | $W_i$ | | |
|---|---|---|---|---|
| 110110 | 28 | 0.5000 | 0.4619 − 0.1913i | 0.3536 − 0.3536i | 0.1913 − 0.4619i |
| 000111 | 29 | 0.5000 | 0.0000 + 0.5000i | 0.5000 | 0.0000 + 0.5000i |
| 010111 | 30 | 0.3082 | 0.0104 + 0.3151i | 0.4077 + 0.4887i | −0.4783 + 0.4145i |
| 100111 | 31 | 0.5587 | −0.2990 + 0.0880i | 0.3361 + 0.2735i | −0.5216 + 0.3616i |
| 110111 | 32 | 0.3117 | −0.2452 + 0.3573i | 0.6025 + 0.1995i | −0.5360 + 0.1578i |
| 001000 | 33 | 0.5000 | 0.5000 | 0.5000 | −0.5000 |
| 011000 | 34 | 0.3117 | 0.3573 − 0.2452i | 0.6025 − 0.1995i | −0.1578 + 0.5360i |
| 101000 | 35 | 0.5587 | 0.0880 − 0.2990i | 0.3361 − 0.2735i | −0.3616 + 0.5216i |
| 111000 | 36 | 0.3117 | 0.3117 − 0.0000i | 0.4030 − 0.4903i | −0.4030 + 0.4903i |
| 001001 | 37 | 0.5000 | 0.0000 + 0.5000i | −0.5000 | 0.0000 + 0.5000i |
| 011001 | 38 | 0.3117 | 0.2452 + 0.3573i | −0.6025 + 0.1995i | 0.5360 + 0.1578i |
| 101001 | 39 | 0.5587 | 0.2990 + 0.0881i | −0.3362 + 0.2735i | 0.5216 + 0.3616i |
| 111001 | 40 | 0.3117 | −0.0000 + 0.3117i | −0.4030 + 0.4903i | 0.4903 + 0.4030i |
| 001010 | 41 | 0.5000 | −0.5000 | 0.5000 | 0.5000 |
| 011010 | 42 | 0.3082 | −0.3666 + 0.2426i | 0.6092 − 0.1842i | 0.1615 − 0.5298i |
| 101010 | 43 | 0.5587 | −0.0880 + 0.2990i | 0.3361 − 0.2735i | 0.3616 − 0.5216i |
| 111010 | 44 | 0.3082 | −0.3152 − 0.0036i | 0.4076 − 0.4888i | 0.4040 − 0.4872i |
| 001011 | 45 | 0.5000 | 0.0000 − 0.5000i | −0.5000 | 0.0000 − 0.5000i |
| 011011 | 46 | 0.3117 | −0.2452 − 0.3573i | −0.6025 + 0.1995i | −0.5360 − 0.1578i |
| 101011 | 47 | 0.5587 | −0.2990 − 0.0880i | −0.3361 + 0.2735i | −0.5216 − 0.3616i |
| 111011 | 48 | 0.3082 | 0.0036 − 0.3152i | −0.4076 + 0.4888i | −0.4872 − 0.4040i |
| 001100 | 49 | 0.5000 | 0.3536 + 0.3536i | 0.0000 + 0.5000i | −0.3536 + 0.3536i |
| 011100 | 50 | 0.3117 | 0.4260 + 0.0793i | 0.1995 + 0.6025i | 0.2674 + 0.4906i |
| 101100 | 51 | 0.5636 | 0.2741 − 0.1559i | 0.2672 + 0.3332i | 0.1081 + 0.6236i |
| 111100 | 52 | 0.3117 | 0.2204 + 0.2204i | 0.4903 + 0.4030i | 0.0618 + 0.6317i |
| 001101 | 53 | 0.5000 | −0.3536 + 0.3536i | 0.0000 − 0.5000i | 0.3536 + 0.3536i |
| 011101 | 54 | 0.3117 | −0.0793 + 0.4260i | −0.1995 − 0.6025i | 0.4906 − 0.2674i |
| 101101 | 55 | 0.5636 | 0.1559 + 0.2741i | −0.2672 − 0.3332i | 0.6236 − 0.1081i |
| 111101 | 56 | 0.3117 | −0.2204 + 0.2204i | −0.4903 − 0.4030i | 0.6317 − 0.0618i |
| 001110 | 57 | 0.5000 | −0.3536 − 0.3536i | 0.0000 + 0.5000i | 0.3536 − 0.3536i |
| 011110 | 58 | 0.3117 | −0.4260 − 0.0793i | 0.1995 + 0.6025i | −0.2674 − 0.4906i |
| 101110 | 59 | 0.5587 | −0.2737 + 0.1492i | 0.2735 + 0.3361i | −0.1132 − 0.6245i |
| 111110 | 60 | 0.3082 | −0.2154 − 0.2302i | 0.4887 + 0.4077i | −0.0451 − 0.6313i |
| 001111 | 61 | 0.5000 | 0.3536 − 0.3536i | 0.0000 − 0.5000i | −0.3536 − 0.3536i |
| 011111 | 62 | 0.3117 | 0.0793 − 0.4260i | −0.1995 − 0.6025i | −0.4906 + 0.2674i |
| 101111 | 63 | 0.5587 | −0.1492 − 0.2737i | −0.2735 − 0.3361i | −0.6245 + 0.1132i |
| 111111 | 64 | 0.3082 | 0.2254 − 0.2204i | −0.4888 − 0.4076i | −0.6302 + 0.0588i | where i is a codeword index, index is a binary codeword index, and $W_i$ is the i-th codeword.

22. The method of claim 16, wherein the codebook comprises a rank-2 codebook expressible as:

| index | m | i, j |
|---|---|---|
| 000000 | 1 | 1, 5 |
| 000001 | 2 | 1, 7 |
| 000010 | 3 | 1, 9 |
| 000011 | 4 | 1, 17 |
| 000100 | 5 | 1, 21 |
| 000101 | 6 | 1, 25 |
| 000110 | 7 | 3, 11 |
| 000111 | 8 | 5, 11 |
| 001000 | 9 | 5, 13 |
| 001001 | 10 | 5, 25 |
| 001010 | 11 | 5, 29 |
| 001011 | 12 | 5, 32 |
| 001100 | 13 | 5, 9 |
| 001101 | 14 | 6, 9 |
| 001110 | 15 | 6, 13 |
| 001111 | 16 | 8, 25 |
| 010000 | 17 | 9, 13 |
| 010001 | 18 | 9, 25 |
| 010010 | 19 | 9, 29 |
| 010011 | 20 | 9, 31 |
| 010100 | 21 | 10, 14 |
| 010101 | 22 | 10, 25 |
| 010110 | 23 | 11, 15 |
| 010111 | 24 | 13, 17 |
| 011000 | 25 | 13, 21 |
| 011001 | 26 | 15, 29 |
| 011010 | 27 | 17, 25 |
| 011011 | 28 | 17, 29 |
| 011100 | 29 | 20, 24 |
| 011101 | 30 | 21, 25 |
| 011110 | 31 | 21, 29 |
| 011111 | 32 | 21, 30 |
| 100000 | 33 | 33, 37 |
| 100001 | 34 | 33, 45 |
| 100010 | 35 | 33, 46 |
| 100011 | 36 | 33, 41 |
| 100100 | 37 | 34, 37 |
| 100101 | 38 | 35, 45 |
| 100110 | 39 | 36, 41 |
| 100111 | 40 | 36, 44 |
| 101000 | 41 | 37, 41 |
| 101001 | 42 | 37, 43 |
| 101010 | 43 | 38, 41 |
| 101011 | 44 | 39, 47 |
| 101100 | 45 | 40, 45 |
| 101101 | 46 | 40, 48 |
| 101110 | 47 | 41, 45 |
| 101111 | 48 | 41, 47 |
| 110000 | 49 | 49, 53 |
| 110001 | 50 | 49, 57 |
| 110010 | 51 | 49, 61 |
| 110011 | 52 | 49, 62 |
| 110100 | 53 | 50, 53 |
| 110101 | 54 | 51, 59 |
| 110110 | 55 | 52, 57 |
| 110111 | 56 | 53, 57 |
| 111000 | 57 | 53, 61 |
| 111001 | 58 | 54, 57 |
| 111010 | 59 | 55, 63 |
| 111011 | 60 | 56, 61 |

-continued

| index | m | i, j |
|---|---|---|
| 111100 | 61 | 56, 64 |
| 111101 | 62 | 57, 61 |
| 111110 | 63 | 57, 63 |
| 111111 | 64 | 58, 61 | where m is an integer value and a codeword index, index is a binary codeword index, and i and j are indices to codewords in a rank-1 codebook.

23. The method of claim 16, wherein the codebook is a unitary codebook.

24. A communications device comprising:
a processor; and
a computer readable storage medium storing programming for execution by the processor, the programming including instructions to:
estimate a communications channel between the communications device and a controller serving the communications device to produce a channel estimate; and
quantize the channel estimate using a codebook to produce a selected codeword, wherein the codebook has a hierarchical structure and comprises a plurality of first level codewords and a plurality of sets of subsidiary codewords, wherein the sets of subsidiary codewords do not comprise any first level codewords, and wherein each of the first level codewords is associated with a unique one of the sets of subsidiary codewords, and wherein the instructions to quantize the channel estimate using a codebook include instructions to identify M first level codewords out of the plurality of first level codewords, where M is a non-zero integer value greater than or equal to two.

25. The communications device of claim 24, wherein the programming further includes instructions to transmit an index corresponding to the selected codeword to the controller.

26. The communications device of claim 24, wherein the instructions to quantize the channel estimate using a codebook to produce a selected codeword further include instructions to:
perform a first stage quantization of the channel estimate using only the plurality of first level codewords to produce a selected first level codeword;
perform a second stage quantization of the channel estimate using only the set of subsidiary codewords associated with the selected first level codeword to produce a selected subsidiary codeword; and
determine whether to use the selected first level codeword or the selected subsidiary codeword as the selected codeword, wherein the determination is based on which codeword provides a better solution to a codeword selection mechanism.

27. The communications device of claim 26, wherein the instructions to perform the first stage quantization include instructions to select one of the plurality of first level codewords that provides a best solution to the codeword selection mechanism as the selected first level codeword.

28. The communications device of claim 26, wherein the instructions to perform a second stage quantization of the channel estimate include instructions to select a codeword from the set of subsidiary codewords associated with the selected first level codeword that provides a best solution to the codeword selection mechanism as the selected subsidiary codeword.

29. The communications device of claim 26, wherein the programming further included instructions to normalize the channel estimate prior to performing a first stage quantization of the channel estimate.

* * * * *